US010970750B1

(12) United States Patent
Hong et al.

(10) Patent No.: US 10,970,750 B1
(45) Date of Patent: *Apr. 6, 2021

(54) GROUPING USERS INTO TIERS BASED ON SIMILARITY TO A GROUP OF SEED USERS

(71) Applicant: Facebook, Inc., Menlo Park, CA (US)

(72) Inventors: Sue Ann Hong, San Francisco, CA (US); Gunjit Singh, San Francisco, CA (US); Kyle Edward Johnson, San Francisco, CA (US); Atif Zahoor Khan, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 16/296,112

(22) Filed: Mar. 7, 2019

Related U.S. Application Data

(63) Continuation of application No. 14/970,873, filed on Dec. 16, 2015, now Pat. No. 10,242,386.

(51) Int. Cl.
*G06Q 30/00* (2012.01)
*G06Q 30/02* (2012.01)
*G06F 16/35* (2019.01)

(52) U.S. Cl.
CPC ......... *G06Q 30/0269* (2013.01); *G06F 16/35* (2019.01); *G06Q 30/0277* (2013.01)

(58) Field of Classification Search
CPC ................. G06Q 30/0207–0277; G06F 16/35
See application file for complete search history.

(56) References Cited

U.S. PATENT DOCUMENTS

| | | | |
|---|---|---|---|
| 2007/0038516 A1* | 2/2007 | Apple | G06Q 30/02 705/14.42 |
| 2010/0287282 A1 | 11/2010 | MacLaughlin | |
| 2011/0125763 A1* | 5/2011 | Takanen | G06F 16/435 707/749 |
| 2012/0041822 A1* | 2/2012 | Landry | G06Q 30/0269 705/14.58 |
| 2012/0290950 A1 | 11/2012 | Rapaport et al. | |
| 2013/0024852 A1* | 1/2013 | Firman | G06F 8/71 717/170 |
| 2015/0012350 A1* | 1/2015 | Li | G06Q 10/06395 705/14.42 |

(Continued)

OTHER PUBLICATIONS

United States Office Action, U.S. Appl. No. 14/970,873, dated Mar. 14, 2018, 15 pages.

*Primary Examiner* — Kambiz Abdi
*Assistant Examiner* — Christopher Stroud
(74) *Attorney, Agent, or Firm* — Fenwick & West LLP

(57) ABSTRACT

An online system identifies seed users of high value to a sponsored content provider. Characteristics of the seed users are identified, and additional users having a threshold measure of similarity to the seed users are identified based on the characteristics. A score is determined for each of the additional users based on the measure of similarity. The seed users are placed in an initial tier of a tiered set of users for the sponsored content, and the additional users are placed in additional tiers of the tiered set of users based upon the determined scores such that each additional tier includes those users of the additional users having a specified range of determined scores, the tiers of the tiered set of users ranked according to the determined scores of users within each tier.

20 Claims, 4 Drawing Sheets

(56) References Cited

U.S. PATENT DOCUMENTS

| | | |
|---|---|---|
| 2015/0127565 A1 | 5/2015 | Chevalier et al. |
| 2015/0178282 A1 | 6/2015 | Gorur et al. |
| 2015/0212654 A1* | 7/2015 | Beckett, Jr. ........ G06Q 30/0271 705/14.67 |
| 2016/0048556 A1 | 2/2016 | Kelly et al. |

* cited by examiner

GROUPING USERS INTO TIERS BASED ON SIMILARITY TO A GROUP OF SEED USERS

CROSS REFERENCE TO RELATED APPLICATIONS

This application is a continuation of co-pending U.S. application Ser. No. 14/970,873, filed Dec. 16, 2015, which is incorporated by reference in its entirety.

BACKGROUND

This disclosure relates generally to online systems storing identity information for users, and in particular to grouping users into tiers based upon a computed similarity score to a group of seed users.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for entities to increase awareness about products or services by presenting sponsored content to online system users.

Presenting sponsored content to users of an online system allows an entity sponsoring the content to gain public attention for products or services and to persuade online system users to take an action regarding the entity's products, services, opinions, or causes. Generally, these entities each have websites accessible to online system users. However, these entities generally do not have access to the identity information that an online system, such as a social networking system, stores and associates with users, which can be a wealth of valuable targeting information about these users. This limitation of the information available to entities providing sponsored content makes it difficult for them to effectively identify sponsored content to provide to the online system for presentation to various users and to identify which group of users is the optimal to target with this sponsored content.

In other words, the entity is limited in its ability to most efficiently target the sponsored content as the entity has less ability to identify those users of the online system that would respond in a cost effective way to the sponsored content, e.g., those users who would provide a positive return on investment that the entity makes in presenting the sponsored content to the user.

SUMMARY

Embodiments of the invention include an online system that identifies users and organizes them into different tiers, with a central tier representing a high value group of seed users and each tier further from the central tier representing users who are progressively less like the central tier of users according to a measure of similarity.

The online system identifies seed users of an online system as a set of highest value users for a sponsored content provider for the sponsored content to be provided for display. These users may be ones expected to provide a highest return on investment (ROI) for the sponsoring entity. These high value seed users may be determined by the sponsored content provider, or may be determined by the online system based on revenue or other information provided by the sponsored content provider to the online system.

The online system identifies one or more characteristics of each of the seed users or characteristics in common across the seed users. These characteristics may include user actions on the online system (e.g., posting a comment), connections between users within the online system, and other information that may be gathered using the online system. Using these characteristics, the online system identifies additional users in the online system that have at least a threshold measure of similarity to one or more of the seed users. The online system may determine the measure of similarity based on comparing the characteristics of the additional users with the identified characteristics of the seed users. In some embodiments, using one or more statistical models, the online system determines whether the additional users pass a threshold level of similarity to the seed users.

In one embodiment, after identifying the additional users, the online system determines a score for each of these additional users. The score for each user is determined by the online system in part based on the measure of similarity that is computed between each user and the group of seed users. In some cases, the measure of similarity may be scaled to a percentage value, where users with high percentage value are determined to be more similar to the seed users, and thus more likely to produce a higher value for the sponsored content provider.

The online system places the seed users in an initial tier of a tiered set of users for the sponsored content, and places the additional users in different tiers of the tiered set of users based on the previously determined score for that user. Each tier of the tiered set of users includes users with a particular range of scores (e.g., each tier includes users that fall within a score range of 1% away from an adjacent tier). The innermost tiers include users with a high score. Those users at the outermost tier may have scores that are at or close to the threshold measure of similarity. Alternatively, the seed users may be placed in a first group, with additional groups having progressively lower scores being placed in subsequent groups, with each group representing a percentage of users of the online system.

Additionally, each tier may be presented to a sponsored content provider in an application with a user interface indicating the value associated with each tier, such as the ROI for each tier. Using such a system, a sponsored content provider may easily determine which users to target to present the sponsored content. The sponsored content provider may be able to target additional users, not simply based on simple demographic indicators, but based on a complex measure of similarity derived from the large amount of data gathered by the online system regarding users of the online system, especially since that data can be conveniently represented in tiers.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
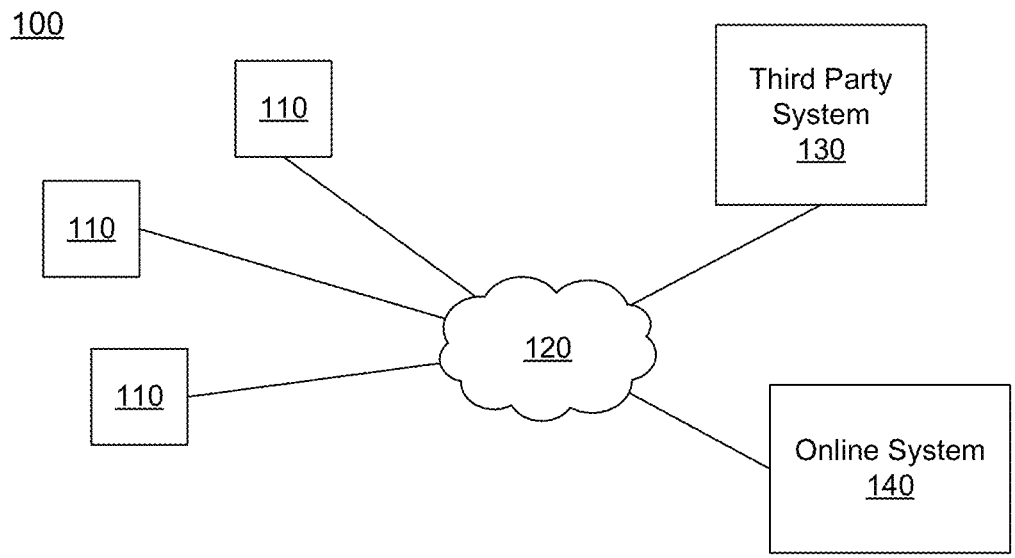
FIG. 1 is a high level block diagram of a system environment for an online system, according to an embodiment.

FIG. 1 is a high level block diagram of a system environment 100 for an online system 140, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a sponsored content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130. Specifically, in one embodiment, a third party system 130 communicates sponsored content, such as advertisements, to the online system 140 for display to users of the client devices 110. The sponsored content may be created by the entity that owns the third party system 130. Such an entity may be an advertiser or a company producing a product or service that the company wishes to promote.

Figure 2:
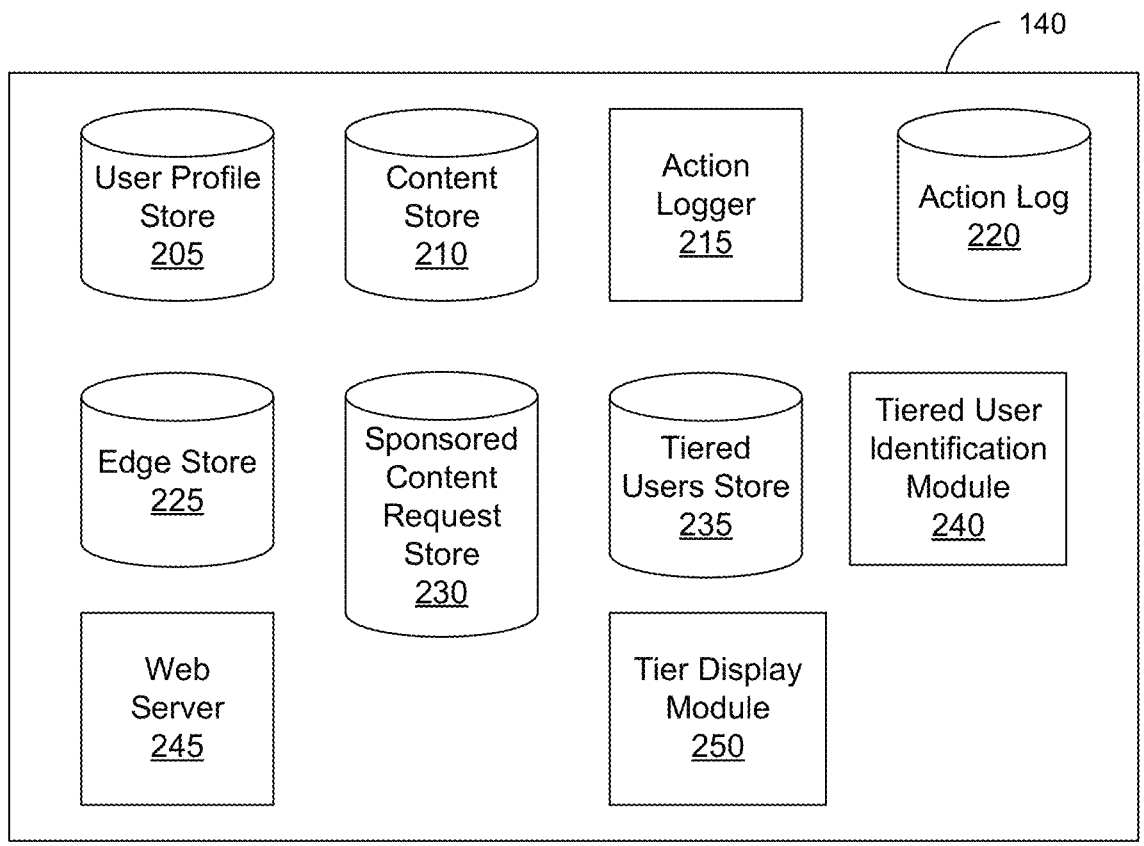
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a sponsored content request store 320, a tiered users store 235, a tiered user identification module 240, a tier display module 250, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The sponsored content request store 230 stores one or more sponsored content requests. Sponsored content is content that an entity presents to users of an online system and allows an entity sponsoring the content to gain public attention for products or services and to persuade online system users to take an action regarding the entity's products, services, opinions, or causes. In one embodiment, a sponsored content is an advertisement, and the sponsored content request store 230 stores advertisement requests ("ad requests"). An ad request includes advertisement content, also referred to as an "advertisement" and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the online system 140 if advertisement content in the ad request is presented to a user, if the advertisement content in the ad request receives a user interaction when presented, or if any suitable condition is satisfied when advertisement content in the ad request is presented to a user. For example, the bid amount specifies or is used to compute a monetary amount that the online system 140 receives from the advertiser if advertisement content in an ad request is displayed. In some embodiments, the expected value to the online system 140 of presenting the advertisement content may be determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The tiered user identification module 240 identifies users of the online system 140 to be categorized into tiers based on a similarity with a seed group of users. Initially, a group of seed users is identified for a sponsored content. These seed users are users that are expected to have the highest value for an entity's sponsored content. The highest value may be measured in terms of return on investment (ROI) (e.g., how much revenue the user generates vs. the cost to present the sponsored content to the user).

In one embodiment, the tiered user identification module 240 identifies these users based on information provided by the third party system 130 for a sponsored content. In another embodiment, the tiered user identification module 240 identifies these users based on other factors, such as the actions of users of the online system with regards to a sponsored content or other similar sponsored content.

After identifying these seed users, the tiered user identification module 240 identifies characteristics for these seed users. The characteristics for each seed user may include various actions that the seed user has performed with regard to the online system 140. In one embodiment, the characteristics include information about the user in the user profile store 205, content store 210, action log 220, and edge store 225. Examples of such actions may include posts that the user has commented on and links that the user has shared, etc.

The tiered user identification module 240 identifies a group of additional users who have a similarity to the group of seed users based on similar characteristics shared between these two groups of users. The tiered user identification module 240 then assigns a score for each of these additional users based on the level of similarity of the characteristics.

In one embodiment, the tiered user identification module 240 places the seed users in a central tier for a tiered set of users for the sponsored content, and places the additional users in separate tiers that move outward from the central tier. Each tier that is further away from the central tier have users with progressively lower similarity scores, with the outermost tier including the users who are at the border of a threshold measure of similarity with the seed users.

In one embodiment, the tiered user identification module 240 determines that the users are placed in groups based on their similarity score. The tiered user identification module 240 places the seed users in a first group, a next set of users with a range of highest similarity scores in a second group, a third group of users with a range of next highest similarity score in third group, and so on. In one embodiment, each range of scores is a single percentage point. In one embodiment, the number of users in each group is approximately one percentage point of the entire population of the users of the online system that are within a same geographic region, or within a certain geographical range, as the group of seed users.

Additional details regarding the tiered user identification module 240 will be described with reference to FIG. 3 and FIG. 4.

The tiered users store 235 stores information about users that have been categorized into tiers by the tiered user identification module 240. Once the tiered user identification module 240 creates a set of tiers for a particular sponsored content, the information regarding these tiers is stored in the tiered users store 235. The tiered users store 235 may store an association between each user of the online system and the tiers the user has been placed in. The tiered users store 235 may also store the tiers associated with each sponsored content. For each tier associated with each sponsored content, the tiered users store 235 may also store the data about users for that tier, as well as additional metadata for that tier. The metadata may include a return on investment for the users of the tier, the score for the tier, any similar characteristics for users of that tier, and so on.

The tier display module 250 displays the tiers as created by the tiered user identification module 240. When an entity providing sponsored content wishes to present the sponsored content to certain users, that entity may wish to see which users provide the most value (e.g., for ROI, etc.). The tier display module 250 may show or provide for display to the entity a display interface including the tiers as calculated by the tiered user identification module 240 for the sponsored content selected by the entity. As noted above, the tiers are not based directly off the sponsored content, but based off a group of seed users associated with this sponsored content. Each tier includes a score, and the score may be a percentage difference between that tier and the central tier of seed users. In one embodiment, each tier represents a 1% difference. In another embodiment, each tier represents 1% of the population of users of a particular geographic region. Furthermore, each tier may include the expected ROI or other metric for the users in the group. This allows the entity to easily ascertain the tiers of users for which the entity would like to present the sponsored content to.

The web server 245 links the online system 140 via the network 120 to the one or more client devices 110, as well as to the one or more third party systems 130. The web server 140 serves web pages, as well as other web-related content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or RIM®.

Grouping Users into Tiers Based on a Similarity Score

Figure 3:
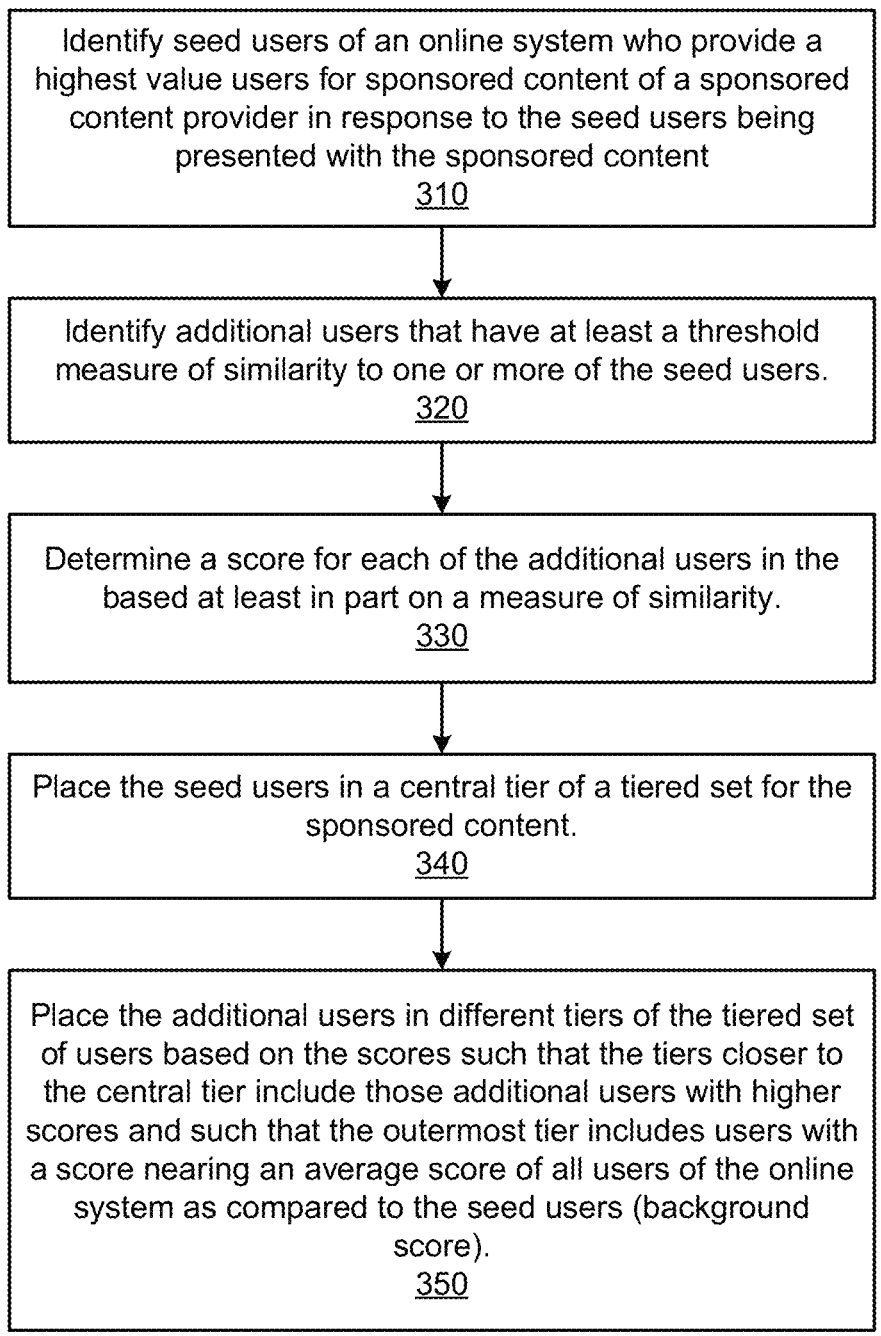
FIG. 3 is a flowchart of one embodiment of a method in an online system for creating tiered users for a sponsored content, according to an embodiment.

FIG. 3 is a flowchart of one embodiment of a method in an online system for creating tiered users for a sponsored content, according to an embodiment. In other embodiments, the method may include different and/or additional steps than those described in conjunction with FIG. 3. Additionally, in some embodiments, the method may perform the steps described in conjunction with FIG. 3 in different orders. In one embodiment, the method is performed by the tiered user identification module 240.

Initially, the online system 140 identifies 310 seed users of an online system who provide as highest value users for sponsored content of an entity (e.g., a third party system 130).

In one embodiment, the online system 140 receives information from the third party system 130 directly identifying a plurality of users as seed users. This information includes any information that may uniquely identify a user, such as an email address, social network username, unique identifier, contact information, address, phone number, name, and so on. For example, the third party system 130 may provide to the online system 140 a list of email addresses associated with users that the third party system 130 considers to be of high value. Once the online system 140 has the list of users, the system can identify or determine the identity of these users by matching them to user profiles stored in the user profile store 205 (assuming the users on the list from the third party system 130 are also users of the online system and hence have user profiles in the online system). For example, the module 240 can match the email address of a user to the email address in the user profile store to determine that it is the same user, and thus the system now has additional identifying information about that user (e.g., the information in the user profile). In some cases, not all of users are users of the online system, in which case the module 240 may be unable to identify certain of the users within the online system. These users may be excluded from the seed user group.

In one embodiment, to identify these seed users, the online system 140 receives a business rule from the third party system 130 that identifies users to be placed in audience groups. An audience group is group of one or more users having at least one common characteristic, such as performing a specific type of interaction with content. Examples of interactions include a user visiting a particular page or content, a number of times a user visits a particular page of a website, a user accessing a particular advertisement, a user performing a specified type of action on an application associated with a third party system 130, etc. In one embodiment, an audience group identifier is stored in the user profile store 205 and associated with user identifying information of users in the corresponding audience group.

A business rule specifies criteria for generating one or more audience groups including one or more users of the online system 140 and may be provided by the third party system 130. In one embodiment, one or more business rules identify characteristics of users included in an audience group. Examples of business rules include a user in an audience group based on a time elapsed between a current time and a time when a user performed a specific type of interaction, based on types of actions performed by the user with content provided by a third party system 130 (e.g., viewing a page from a website, clicking, interactions with an application, etc.), based on language of content presented to the user (e.g., a French version of web site versus an English version of the website), or any other suitable criteria. In some embodiments, a custom audience tool is used to identify the audience groups.

After receiving a business rule identifying seed users, the online system 140 uses the business rule to identify those users with profiles in the online system 140 that satisfy the criteria of the business rule, and identifies these users as being part of an audience group of seed users.

In one embodiment, to identify these seed users, the online system 140 receives identifiers from the third party system 130 that may be used to identify the seed users. The third party system 130 uses a hash function to create a secure identifier hash for each of the users the third party system 130 identifies as seed users. This secure identifier hash does not include personally identifiable information for the user. The third party system 130 then transmits the generated secure identifier hashes to the online system 140. The online system 140 uses an equivalent hashing module to create a locally generated secure identifier hash for users of the online system 140. If the locally generated secure identifier hash matches any of the secure identifier hashes received from the third party system 130, the user of the online system 140 that is identified by the locally generated hash is identified as a seed user.

Methods of identifying users by a third party system are further described in U.S. patent application Ser. No. 13/306,901, filed on Nov. 29, 2011, U.S. patent application Ser. No. 14/034,350, filed on Sep. 23, 2013, U.S. patent application Ser. No. 14/177,300, filed on Feb. 11, 2014, and U.S. patent application Ser. No. 14/498,894, filed on Sep. 26, 2014, all of which are hereby incorporated by reference in their entirety.

In one embodiment, the online system 140 itself identifies seed users (or users expected to be of high value to the third party) without input by the third party system 130. The online system 140 can do this by, for example, determining if the actions performed by users after being presented with the sponsored content from the third party system 130 exceed a specified metric.

The actions performed by the users are logged by the online system 140 as described above, and can include actions such as liking, sharing, and otherwise engaging with the sponsored content or objects in the online system 140 that are related to the sponsored content. In one embodiment, the objects that are related to the sponsored content are within a certain degree of connections to the sponsored content. The connections may be stored as edges of the online system 140 as described above.

The actions may also include actions performed outside the online system 140 regarding the sponsored content, such as installing an application on a client device that was promoted by the sponsored content, visiting a web page or other location promoted by the sponsored content, and so on. This information may be provided by the third party system 130 or tracked by the online system 140 using a tracking identifier placed on the user's client device.

The online system 140 determines if the actions performed exceed a certain metric. The metric may be a threshold count of actions, a threshold number of actions made against the sponsored content, a threshold number of actions performed outside the online system 140, and/or any other relevant metric that may be used to measure the value of the user in response to being presented by the sponsored content.

The metric may be an amount of profit (e.g., ROI) generated by the user' actions for the third party system 130 as a result of being presented with the sponsored content. In one embodiment, the ROI for users is calculated by the third party system 130 and provided to the online system. The online system 140 identifies the users of the online system that match the users provided by the third party system 130 (e.g., by matching characteristics of the user's profile with the information provided by the third party system 130), and selects those users that exceed a certain ROI value (e.g., top 1% of ROI among the ROI values provided) as the seed users.

In one embodiment, the third party system 130 provides the online system 140 with estimated revenue for certain types of actions related to the sponsored content, and the online system 140 calculates the estimated revenue for each user based on the actions performed by that user. Those users that exceed a certain estimated revenue are then selected by the online system 140 as seed users.

Once the group of seed users is selected, the online system identifies 320 additional users of the online system 140 that have at least a threshold measure of similarity to one or more of the seed users.

In one embodiment, the online system identifies those additional users as users having at least a threshold number or percentage of characteristics matching or similar to characteristics of the seed users. In some embodiments, the online system 140 identifies additional users having at least a threshold number or percentage of interests matching interests specified by at least a threshold number of the seed users. These interests may be stored in user profiles of the users. Similarly, the online system 140 may identify additional users who interacted with content items of the online system 140 having at least a threshold number or percentage of characteristics matching characteristics of content items with which the seed users interacted. Other characteristics can also be utilized, such as matching demographics between users, similar affinity scores for particular content or types of content, connections to similar content or users, similar patterns of interacting with content, etc.

The online system 140 may train and apply a model to the characteristics of the seed users and the content items that the seed users have interacted with. The model may be any type of statistical model that can make a prediction (e.g., in the form of a percentage) of a similarity of characteristics of a user of the online system 140 to the characteristics trained in the model. For example, a model may predict the similarity based on how many characteristics are shared between two users out of a total number of characteristics logged by the online system 140. Using the model, the online system 140 identifies additional users that have a threshold measure of similarity to the seed users.

The actual threshold value for the threshold measure of similarity may be set at a particular number of sigmas of a standard deviation of all (or a random sampling of) users of the online system 140 as measured using the measurement for the threshold measure of similarity. Alternatively, the threshold measure may be set to the average value of all (or a random sampling of) users of the online system 140 as measured using the measurement for the threshold measure of similarity.

Additional methods of determining similarity between groups of users of an online system are further described in U.S. patent application Ser. No. 13/297,117, filed on Nov. 15, 2011, U.S. patent application Ser. No. 14/290,355, filed on May 29, 2014, U.S. patent application Ser. No. 14/719,780, filed on May 22, 2015, all of which are hereby incorporated by reference in their entirety.

In one embodiment, the seed users and additional users that are identified by the online system 140 are limited to a particular geographical area. The geographical location of each user may be determined by the online system 140 using information in the user's user profile or using other methods such as IP geolocation.

Once the online system 140 identifies the seed users, the online system further determines 330 a score for each of the additional users in the based at least in part on a measure of similarity. In one embodiment, the score is a scaled value, with those users nearest the threshold measure of similarity receiving a lowest score in the scale, and those users with a measure of similarity closest to the seed users receiving the highest score in the scale. In one embodiment, the score is a percentage scale from 0% to 100%, with users closest to the seed users receiving a percentage value of 100% (or 99%, with the seed users receiving a score of 100%), and those users at the threshold measure of similarity receiving a score of 1% or 0%.

Subsequently, the online system 140 places 340 the seed users in a central tier of a tiered set for the sponsored content. The online system also places 350 the additional users in different tiers of the tiered set of users based upon the scores of the additional users. The additional users are placed such that those tiers closer to the central tier include those of the additional users that have higher scores, and such that the outermost tier includes those of the additional users with determined scores that are at a border of the threshold measure of similarity. In other words, as the tiers approach the central tier, the users in those tiers have a greater measure of similarity to the seed users.

In one embodiment, each tier represents a percentage point of score, and the users within that tier fall within that score range. Alternatively, the entity providing the sponsored content may adjust the range of scores included within each tier according to any preference.

In one embodiment, the additional users are separated into groups based on their similarity score. Each group may comprise a percentage of a number of users approximately similar to the total number of users in the geographic region represented by the seed users. Each group has users with similarity scores within a certain range. Thus, the first group may include the first percentage of users with the highest scores, the second group including the second percentage of users with the next highest scores and so on.

In one embodiment, the online system 140 also computes the ROI for each tier. In one embodiment, the online system 140 computes the ROI for each tier based on the compensation the online system 140 received for users in each tier in exchange for presenting the users with the sponsored content, and the revenue received from each user by the entity providing the sponsored content.

The revenue received by the entity may be provided directly by the entity. Alternatively, the online system 140 may compute this revenue information based on a typical ROI percentage for a sponsored content presented by the online system 140 to a user, along with information regarding how many users in that tier are likely to perform a revenue-generating action in relation to the sponsored content in response to being presented with the sponsored content. The online system 140 may also estimate the revenue information based upon information about the entity's industry, the type of sponsored content, how closely the users in the tier match the targeting criteria of the sponsored content and so on.

In one embodiment, the online system 140 also presents the tiers in a user interface to the entity providing the sponsored content. The tiers may be displayed in concentric circles surrounding the central tier, which is presented as a solid circle.

In one embodiment, the online system 140 presents the additional users in a user interface with a slider. The user interface includes a horizontal line, demarcated with numbers indicating a percentage of users within a geographic region matching the geographic region corresponding to the seed users. For example, the entity providing the sponsored content may have selected the U.S. The seed users received by the online system 140 may be from the U.S., or the online system 140 filters the seed users such that they are from the U.S. The additional users are also determined to be from the U.S. as well. As noted above, location determination may be done via IP geolocation, or if the client device accessing the online system includes other location sensing capabilities (e.g., GPS), these capabilities may also be used by the online system 140 to determine the location. The online system 140 receives from the entity an input to one or more slider interfaces on the horizontal line, specifying the percentages of users to select for targeting. Once the online system 140 receives from the entity a selection of selects one or more groups for targeting, the online system 140 may present the entity with an additional interface indicating a sponsored content, bidding price, and/or other options to configure for presenting the sponsored content to the users of each group.

Figure 4:
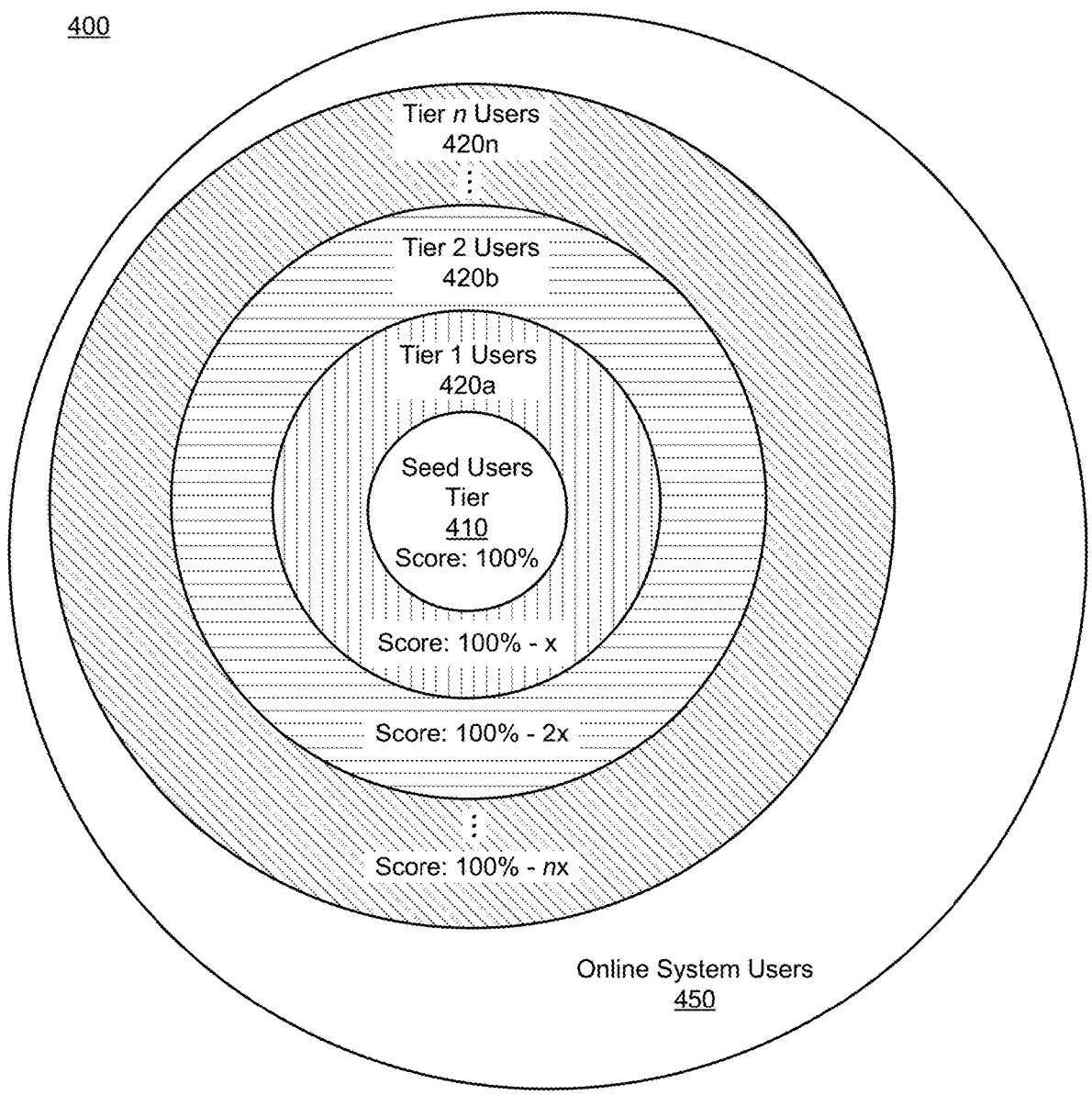
FIG. 4 illustrates a diagrammatic representation of a tiered set of users for a sponsored content, according to an embodiment.

FIG. 4 illustrates a diagrammatic representation 400 of a tiered set of users for a sponsored content, according to an embodiment. In one embodiment, this representation 400 is shown as a graphical representation of a tiered set of users for a sponsored content to an entity providing the sponsored content.

As illustrated, a tier 410 of seed users for a sponsored content is placed in a central tier of the representation 400 of the tiers. As illustrated, the tier 410 of seed users has a score of 100%. Additional tiers 420a-n are shown concentric around the central tier 410. Each of these tiers has a score smaller than the next inner tier by a value x (e.g., x=1%). The users that are placed in tier n, the last tier in the tiered set of users, are the users that are directly above (i.e., just exceed) the threshold measure of similarity as described above.

While each tier is shown as having a larger area than tiers inside of it, this is not meant to indicate that there are necessarily more users that fit within that tier compared to the tiers represented inside of it. Instead, the larger tier is meant to indicate that the score of users within that tier are further from the central tier 410.

The final concentric circle 450 represents all the users of the online system. These users are not part of the tiered set of users. Instead, this circle is meant to indicate the remaining users of the online system 140.

The tier information may be presented to the entity providing the sponsored content using a graphical representation. This representation may be presented to the entity by the online system using an application (e.g., a web application) on a client device accessible by the entity. In a graphical representation of the tiered set of users, an entity providing the sponsored content is able to view the details of each tier as the tier is interacted with. For example, upon interaction, each graphical representation of a tier may display the ROI for that tier, the users in that tier, the metadata for that tier, including any significant statistics such as demographics, and so on. The entity is then able to select which tier(s) to present the sponsored content to, and the compensation (e.g., the bid) to the online system 140 for presenting the sponsored content for each tier. Instead of selecting just by demographic or some other simple variable, the entity is able to directly identify an expanded audience of users who have a measure of similarity to a seed group of users. Such a tiered grouping of users allows the entity to easily visualize and select those users that may provide for a highest profit generation.

Figure 5:
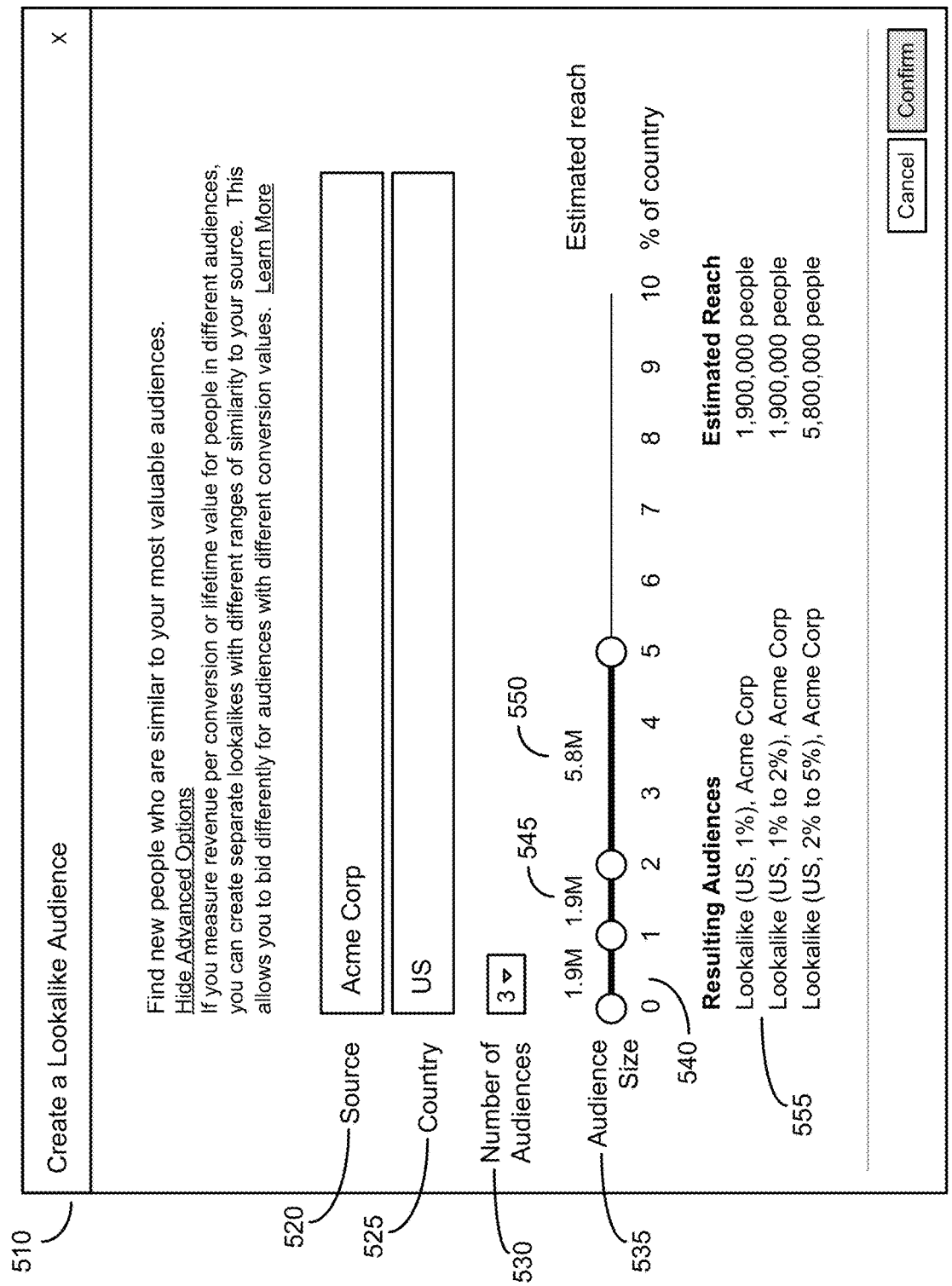
FIG. 5 illustrates an exemplary user interface for configuring a tiered set of users, according to an embodiment.

FIG. 5 illustrates an exemplary user interface 510 for configuring a tiered set of users, according to an embodiment. In other embodiments, the arrangement of elements in the user interface may be different.

The online system 140 presents the user interface (UI) 510 to an entity providing sponsored content to present to users of the online system. The online system presents in the UI 510 a source selection 520 to allow the entity to select a source (e.g., by providing suggested items as the user enters text or via a drop down menu). The source provided here may represent a source of seed users for which the online system 140 determines one or more groups of tiered users as described above. The online system 140 also presents the entity with an option of a country selection 525 to select a geographic region to filter the users indicated in the source selection 520. The online system 140 may also use the country selection 525 as a filter when searching for additional users for determining a the tiered users as described above. If the entity does not select a country, the online system 140 may instead filter the users based on the geographic region of the source users selected in the source selection 520, or may search using all the users of the online system 140.

The online system 140 presents an audience number selection 530 to the entity to allow the entity to select for the number of audiences to target when presenting the sponsored content. For each audience, the online system 140 provides the entity with additional options to customize various targeting criteria, such as bid amount. In the example illustrated in FIG. 5, three audiences are selected. Thus, in the audience size selection 535, the online system 140 presents the entity with four slider interfaces represented by circles that may be used to select the three audiences of users 540, 545, and 550. The audience size selection 535 is represented by a horizontal line with numbers indicated on the line at regular intervals. Each number indicates a percentage of users of the online system within the country selected in the country selection 525. For example, the region of the horizontal line from "1" to "2" represents one percentage of the number of users of the online system in the country indicated. Furthermore, the users represented on the horizontal line in the region with smaller valued numbers have higher similarity to the seed users indicated in the source selection 520, than those users represented in the higher valued numbers. For example, the one percentage of users in the region from "9" to "10" have a lower similarity score than the users represented in the region from "0" to "1."

The online system 140 allows the entity to adjust the sliders in any combination on the horizontal line of the audience size selection 535 in order to select any combination of audiences. After the sliders are adjusted, the regions in-between each slider in the horizontal line represent the audiences that are selected. The online system 140 further displays above each region the estimated number of users of the online system 140 that may be included in this audience. Note that this estimated number of users is an estimate of the number of users with a particular similarity score as represented by the selection and not a number of users of an arbitrary selection of users of the online system. In the illustrated example, an audience 540 with 1.9M users is selected from "0" to "1," an audience 545 with 1.9M users is selected based on the sliders at "1" and "2," and an audience 550 of 5.8M users is selected based on the sliders at position "2" and "5." Finally, the online system 140 also presents an indicator 555 with a summary of the selected audiences and the estimated reach in verbose form to the entity. This indication 555 updates dynamically as the entity adjusts the sliders in the audience size selection 535.

After selecting the audiences, the online system 140 may further present to the entity a second interface (not shown) for customizing various options for each audience. The online system 140 may also display additional information for each audience, such as estimated ROI, and other options as described above. This allows the entity to better target and select for users to present its sponsored content to.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    identifying, using a computing device of a social networking system, a plurality of seed users of the social networking system as high value users for sponsored content of a sponsored content provider;
    identifying one or more characteristics of each of the plurality of seed users, wherein the characteristics are stored in the social networking system;
    identifying additional users having a measure of similarity to the plurality of seed users that is above at least a threshold measure of similarity, the measure of similarity based at least in part on characteristics of the additional users matching the identified one or more characteristics associated with a threshold number of the plurality of seed users;
    determining a score for each of the additional users, the score for an additional user based at least in part on the measure of similarity between the additional user and the plurality of seed users;
    placing the plurality of seed users in an initial tier of a tiered set of users for the sponsored content;
    placing the additional users in additional tiers of the tiered set of users based upon the determined scores such that each additional tier includes those users of the additional users having a specified range of determined scores, the tiers of the tiered set of users ranked according to the determined scores of users within each tier, wherein each additional tier of the tiered set of users includes tiers which have users that have determined scores which are higher than the determined scores of the additional users in the additional tier;

transmitting a graphical user interface to a client device of the sponsored content provider, the graphical user interface providing a selection option for a number of audiences based on the tiered set of users, selection of the number of audiences generating a corresponding number of user interface sliders in the graphical user interface, each user interface slider placed on a scale user interface element, the scale user interface element having indicators corresponding to each of the tiers of the tiered set of users and indicating different measures of similarity of each of the tiers to the plurality of seed users, wherein a movement of each of the user interface sliders along the scale user interface element to one or more positions causes an update of displayed information corresponding to the one or more positions;

receiving an indication from the client device of the sponsored content provider of one or more positions for each of the user interface sliders, each position indicating a corresponding range of tiers of the tiered set of users, each range of tiers corresponding to a targeted audience selected by the sponsored content provider; and transmitting to the client device of the sponsored content provider updated information about users in each of the selected targeted audiences for display in the graphical user interface, the updated information indicating at least an estimated number of users in each of the selected targeted audiences and including an indicator summarizing the targeted audiences corresponding to each of the selected targeted audiences and an estimated reach of the selected targeted audiences.

2. The method of claim 1, wherein the identifying seed users of the social networking system further comprises:
receiving, by the social networking system from the sponsored content provider, a list of entries having identifying information for users of high value for the sponsored content provider;
matching, based on the identifying information, one or more entries in the list with identifiers of users of the social networking system to identify a plurality of the users associated with the entries on the list; and
selecting, as seed users, those users of the social networking system that match the one or more entries in the list.

3. The method of claim 1, wherein the identifying seed users of the social networking system further comprises:
receiving post interaction activity information for users who are presented with the sponsored content, the post interaction activity including actions performed by each user in the social networking system after being presented with the sponsored content; and
selecting as seed users those users with post interaction activity having a value exceeding a specified metric.

4. The method of claim 1, wherein each additional tier represents a number of users of the social networking system that are approximately within a threshold of one percentage of the of a number of users of the social networking system whom are within a similar geographic region as the seed users.

5. The method of claim 1, wherein the graphical user interface displays the tiered set of users to allow the sponsored content provider to adjust a range of scores represented by each tier such that each tier has scores customized to match a preference of the sponsored content provider.

6. The method of claim 1, further comprising:
computing, for the sponsored content provider, an estimated average return on investment (ROI) per tier for the additional users.

7. The method of claim 6, wherein the computing the estimated ROI further comprises:
receiving revenue information from the sponsored content provider for those users in each tier that have been presented with the sponsored content;
retrieving the compensation provided by the sponsored content provider in exchange for having the social networking system present the sponsored content to those users in each tier that have been presented with the sponsored content; and
determining the average ROI for each tier based on the revenue and the compensation for those users in each tier that have been presented with the sponsored content.

8. The method of claim 1, further comprising displaying the range of the determined scores for the users of each tier in the graphical user interface.

9. The method of claim 1, wherein the characteristics of the additional users are based on social network user information and previously recorded social network actions of the additional users as stored by the social networking system.

10. The method of claim 1, wherein determining the score for each of the additional users comprises:
applying a model to the characteristics of the additional user and to the characteristics of seed users; and
determining the score for the additional user based on application of the model.

11. A computer program product comprising a non-transitory computer readable storage medium having instructions encoded thereon that, when executed by a processor, cause the processor to:
identify, using a computing device of a social networking system, a plurality of seed users of the social networking system as high value users for sponsored content of a sponsored content provider;
identify one or more characteristics of each of the plurality of seed users, wherein the characteristics are stored in the social networking system;
identify additional users having a measure of similarity to the plurality of seed users that is above at least a threshold measure of similarity, the measure of similarity based at least in part on characteristics of the additional users matching the identified one or more characteristics associated with a threshold number of the plurality of seed users;
determine a score for each of the additional users, the score for an additional user based at least in part on the measure of similarity between the additional user and the plurality of seed users;
place the plurality of seed users in an initial tier of a tiered set of users for the sponsored content;
place the additional users in additional tiers of the tiered set of users based upon the determined scores such that each additional tier includes those users of the additional users having a specified range of determined scores, the tiers of the tiered set of users ranked according to the determined scores of users within each tier, wherein each additional tier of the tiered set of users includes tiers which have users that have determined scores which are higher than the determined scores of the additional users in the additional tier;
transmit a graphical user interface to a client device of the sponsored content provider, the graphical user interface providing a selection option for a number of audiences based on the tiered set of users, selection of the number of audiences generating a corresponding number of user interface sliders in the graphical user interface, each user interface slider placed on a scale user interface element, the scale user interface element having indicators corresponding to each of the tiers of the tiered set of users and indicating different measures of similarity of each of the tiers to the plurality of seed users, wherein a movement of each of the user interface sliders along the scale user interface element to one or more positions causes an update of displayed information corresponding to the one or more positions;

receive an indication from the client device of the sponsored content provider of one or more positions for each of the user interface sliders, each position indicating a corresponding range of tiers of the tiered set of users, each range of tiers corresponding to a targeted audience selected by the sponsored content provider; and transmit to the client device of the sponsored content provider updated information about users in each of the selected targeted audiences for display in the graphical user interface, the updated information indicating at least an estimated number of users in each of the selected targeted audiences and including an indicator summarizing the targeted audiences corresponding to each of the selected targeted audiences and an estimated reach of the selected targeted audiences.

12. The computer program product of claim 11, wherein the non-transitory computer readable storage medium has further instructions encoded thereon for the identification of seed users of the social networking system, that when executed by the processor, cause the processor to:

receive, by the social networking system from the sponsored content provider, a list of entries having identifying information for users of high value for the sponsored content provider;

match, based on the identifying information, one or more entries in the list with identifiers of users of the social networking system to identify a plurality of the users associated with the entries on the list; and select, as seed users, those users of the social networking system that match the one or more entries in the list.

13. The computer program product of claim 11, wherein the non-transitory computer readable storage medium has further instructions encoded thereon for the identification of seed users of the social networking system, that when executed by the processor, cause the processor to:

receive post interaction activity information for users who are presented with the sponsored content, the post interaction activity including actions performed by each user in the social networking system after being presented with the sponsored content; and select as seed users those users with post interaction activity having a value exceeding a specified metric.

14. The computer program product of claim 11, wherein each additional tier represents a number of users of the social networking system that are approximately within a threshold of one percentage of the of a number of users of the social networking system whom are within a similar geographic region as the seed users.

15. The computer program product of claim 11, wherein the graphical user interface displays the tiered set of users to allow the sponsored content provider to adjust a range of scores represented by each tier such that each tier has scores customized to match a preference of the sponsored content provider.

16. The computer program product of claim 11, wherein the non-transitory computer readable storage medium has further instructions encoded thereon, that when executed by the processor, cause the processor to:

computing, for the sponsored content provider, an estimated average return on investment (ROI) per tier for the additional users.

17. The computer program product of claim 16, wherein the non-transitory computer readable storage medium has further instructions encoded thereon for the computation of the estimated ROI, that when executed by the processor, cause the processor to:

receiving revenue information from the sponsored content provider for those users in each tier that have been presented with the sponsored content;

retrieving the compensation provided by the sponsored content provider in exchange for having the social networking system present the sponsored content to those users in each tier that have been presented with the sponsored content; and determining the average ROI for each tier based on the revenue and the compensation for those users in each tier that have been presented with the sponsored content.

18. The computer program product of claim 11, wherein the non-transitory computer readable storage medium has further instructions encoded thereon, that when executed by the processor, cause the processor to:

display the range of the determined scores for the users of each tier in the graphical user interface.

19. The computer program product of claim 11, wherein the characteristics of the additional users are based on social network user information and previously recorded social network actions of the additional users as stored by the social networking system.

20. The computer program product of claim 11, wherein the non-transitory computer readable storage medium has further instructions encoded thereon for the determination of the score for each of the additional users, that when executed by the processor, cause the processor to:

applying a model to the characteristics of the additional user and to the characteristics of seed users; and determining the score for the additional user based on application of the model.

* * * * *

UNITED STATES PATENT AND TRADEMARK OFFICE
CERTIFICATE OF CORRECTION

PATENT NO. : 10,970,750 B1
APPLICATION NO. : 16/296112
DATED : April 6, 2021
INVENTOR(S) : Sue Ann Hong et al.

Page 1 of 1

It is certified that error appears in the above-identified patent and that said Letters Patent is hereby corrected as shown below:

In the Claims

In Column 17, Line 56, Claim 4, delete "of the of a" and insert -- of a --, therefor.

In Column 20, Line 2, Claim 14, delete "of the of a" and insert -- of a --, therefor.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*